United States Patent
Gligor et al.

(10) Patent No.: US 11,200,350 B2
(45) Date of Patent: *Dec. 14, 2021

(54) METHOD AND APPARATUS FOR TRUSTED DISPLAY ON UNTRUSTED COMPUTING PLATFORMS TO SECURE APPLICATIONS

(71) Applicant: CARNEGIE MELLON UNIVERSITY, Pittsburgh, PA (US)

(72) Inventors: Virgil D. Gligor, Pittsburgh, PA (US); Zongwei Zhou, Mountain View, CA (US); Miao Yu, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,183

(22) Filed: Jul. 23, 2020

(65) Prior Publication Data

US 2020/0356703 A1 Nov. 12, 2020

Related U.S. Application Data

(62) Division of application No. 15/752,450, filed as application No. PCT/US2016/055630 on Oct. 6, 2016, now Pat. No. 10,769,312.

(Continued)

(51) Int. Cl.
*G06F 21/84* (2013.01)
*G06F 21/53* (2013.01)
(Continued)

(52) U.S. Cl.
CPC .......... *G06F 21/84* (2013.01); *G06F 9/45508* (2013.01); *G06F 9/45558* (2013.01); *G06F 21/53* (2013.01); *G06F 21/57* (2013.01);
*G06F 21/62* (2013.01); *G06F 21/70* (2013.01); *G06F 21/71* (2013.01); *H04L 63/1491* (2013.01);
(Continued)

(58) Field of Classification Search
CPC .......... G06F 21/84; G06F 21/70; G06F 21/57; G06F 21/62; G06F 21/71; G06F 21/53; G06F 9/45558; G06F 2221/2141; G06F 2221/2149; H04L 63/1491
See application file for complete search history.

(56) References Cited

U.S. PATENT DOCUMENTS 8,832,778 B2   9/2014 McCune et al.
2004/0268135 A1 12/2004 Zimmer et al.
(Continued)

OTHER PUBLICATIONS

International Search Report and Written Opinion for PCT/US16/55630 dated Feb. 3, 2017.

*Primary Examiner* — Thaddeus J Plecha
(74) *Attorney, Agent, or Firm* — Kacvinsky Daisak Bluni PLLC

(57) ABSTRACT

This invention provides a method for providing trusted display to security sensitive applications on untrusted computing platforms. This invention has a minimal trusted code base and maintains full compatibility with the computing platforms, including their software and hardware. The core of the invention is a GPU separation kernel that (1) defines different types of GPU objects, (2) mediates access to security-sensitive GPU objects, and (3) emulates accesses to security-sensitive GPU objects whenever required by computing platform compatibility.

16 Claims, 6 Drawing Sheets

Related U.S. Application Data

(60) Provisional application No. 62/284,695, filed on Oct. 6, 2015.

(51) Int. Cl.
| | |
|---|---|
| *G06F 21/70* | (2013.01) |
| *H04L 29/06* | (2006.01) |
| *G06F 9/455* | (2018.01) |
| *G06F 21/57* | (2013.01) |
| *G06F 21/62* | (2013.01) |
| *G06F 21/71* | (2013.01) |

(52) U.S. Cl.
CPC ............... *G06F 2221/2141* (2013.01); *G06F 2221/2149* (2013.01)

(56) References Cited

U.S. PATENT DOCUMENTS

| | | |
|---|---|---|
| 2005/0283602 A1 | 12/2005 | Vembu et al. |
| 2006/0146057 A1 | 7/2006 | Blythe |
| 2006/0202999 A1 | 9/2006 | Thornton |
| 2008/0209212 A1 | 8/2008 | Ditzman et al. |
| 2008/0316357 A1 | 12/2008 | Achari et al. |
| 2011/0093750 A1* | 4/2011 | Williams .............. G06F 9/5077 714/47.2 |
| 2011/0264922 A1 | 10/2011 | Beaumont et al. |
| 2012/0054744 A1* | 3/2012 | Singh .................. G06F 9/45558 718/1 |
| 2012/0167082 A1 | 6/2012 | Kumar et al. |
| 2014/0026137 A1 | 1/2014 | Vembu et al. |
| 2014/0173600 A1 | 6/2014 | Ramakrishnan Nair |
| 2014/0226815 A1 | 8/2014 | Lo et al. |
| 2015/0002523 A1 | 1/2015 | Zeng et al. |
| 2018/0293700 A1* | 10/2018 | Tian ...................... G06F 9/5027 |

\* cited by examiner

METHOD AND APPARATUS FOR TRUSTED DISPLAY ON UNTRUSTED COMPUTING PLATFORMS TO SECURE APPLICATIONS

RELATED APPLICATIONS

This application is a divisional of U.S. patent application Ser. No. 15/752,450, filed Feb. 13, 2018, which is the U.S. National Stage of International Patent Application No. PCT/US2016/055630, filed Oct. 6, 2016, which claims priority to and benefit of U.S. Provisional Patent Application No. 62/284,695, filed Oct. 6, 2015. The entire contents of these applications are incorporated herein by reference.

GOVERNMENT INTEREST

This invention was made with partial government support under CCF-0424422 from National Science Foundation. The government has certain rights in this invention.

FIELD OF THE INVENTION

This invention generally relates to computing systems, and more particularly relates to computing systems with video cards/graphics processing units (GPUs).

BACKGROUND OF THE INVENTION

A trusted display service provides a protected channel that assures the confidentiality and authenticity of content output on selected screen areas. With it, the primitive users can rely on the information output by a security-sensitive application (SecApp) without worrying about undetectable screen "scrapping", where the display output is surreptitiously read, or "painting", where the display output is surreptitiously modified by malicious software on computing systems, by a compromised operating systems (OSes) or unsecured applications (Apps).

Security architectures that isolate entire SecApps from untrusted OSes and unsecured Applications (Apps) implement trusted display functions via a trusted path. That is, a primitive user's explicit activation of the trusted-path effectively removes all untrusted OS and Apps access to the display device (e.g. video cards) and assigns the device to a SecApp for the entire duration of a session. Unfortunately, the exclusive use of display devices via trusted path does not allow both untrusted OS/Apps and SecApps to output content concurrently on a user's screen. The untrusted output cannot be displayed until after the trusted path releases the screen at the end of the SecApp session. As a consequence, it would not be possible to maintain the typical multi-window user experience for applications that comprise both trusted and untrusted components and use the same display screen.

Some past approaches that allow trusted display of output with different sensitivity on the same screen concurrently have been based on encapsulating and protecting graphics cards within high-assurance security kernels. In addition to requiring changes to the OSes, adopting such an approach for the entire graphics processing unit (GPU) of a video card would not work because the complexity of modern GPU functionality (e.g. 2D/3D hardware rendering, general-purpose computing on GPU (GPGPU), and hardware video encoding/decoding) rules out maintaining a small and simple code base for the security kernel, which is a prerequisite for high assurance. For example, the size of Intel's GPU driver for Linux 3.2.0-36.57 has over 57K SLoC, which is more than twice the size of a typical security kernel. Furthermore, GPU functions operate asynchronously from the Central Processor Units (CPUs) to improve graphics performance and introduce concurrency control for multi-threading in the trusted code base. This would invalidate all correctness proofs that assume single-thread operation.

Full GPU virtualization can be used to enable concurrent display of both trusted and untrusted output on a user's screen without requiring OSes/Apps modification. However, full GPU virtualization, which is largely motivated by improved performance, relies on address-space sharing between different virtual machines (VMs) and the GPU without providing adequate hardware mechanisms for protecting different VMs' code and data within the GPU. Moreover, full GPU virtualization intrinsically requires a large trusted code base; e.g. supporting native GPU drivers/Apps requires emulating all accesses to all GPU configuration registers for the VMs scheduled to access the GPU. Thus, adopting full GPU virtualization for high-assurance trusted display would be impractical.

Unless explicitly mentioned/differentiated, the present invention will use the term "GPU" to refer to both video card and graphic processing unit, as the graphic processing units are the major components in modern video cards.

CPU programs (e.g. GPU drivers and Apps) 100 control GPU execution via five types of objects (also known as programming objects), namely data 108, page tables, commands 106, and instructions 104 that are stored in GPU memory (including GPU device memory and main memory referenced by GPU address spaces 102), and GPU configuration registers 110 as shown in FIG. 1.

CPU programs 100 produce the instructions and commands that are executed by GPU hardware. For example, instructions are executed on GPU processor cores, process input data, and produce results that are used by display engines. In contrast, commands 104 are executed by dedicated command processors and are used to configure the GPU with correct parameters; e.g., specify stack base address used by instructions. Groups of commands 104 are submitted for processing in dedicated command buffers; e.g., they are received in input (ring) buffers from drivers and (batch) buffers from both applications and drivers.

As shown in FIG. 1, a GPU 130 also contains several engines, such as the processing engine 118 and display engine 116, as well as other engines 120. The processing engine 118 executes instructions on multiple GPU cores for computation acceleration. It references memory regions known as the GPU local address space via the GPU local page tables 114. The display engine 116 parses screen pixel data stored in frame buffers according to the engine's configurations, and outputs images for display. Other engine 120 perform a variety of functions such as device-wide performance monitoring and power management.

The display engine 116 defines several basic configurations for frame buffer presentation; e.g. geometry and pixel formats. Furthermore, it provides the data paths from frame buffers to external monitors 140. For example, the screen output may comprise a combination of multiple screen layers, each of which contains a separate frame buffer. In this case, GPUs support a hardware cursor as the front layer of the screen and display it over the primary image. Since a single GPU 130 may be connected to multiple screen monitors, a monitor 140 may consume the same frame buffers as another monitor 140, which implies that GPU memory protection requires a controlled sharing mechanism. Furthermore, an image presented on a screen may be torn as the result of frame-buffer updates by CPU programs during screen refreshing. To address this synchronization problem, display engines 116 of modern GPUs 130 also provide a V-Sync interrupt to notify CPU programs 100 of the time when it is safe to update a frame buffer.

Although the GPU architecture illustrated in FIG. 1 is common to many commodity GPUs, some of these GPUs differ in how memory is accessed and managed. For example, Intel's GPUs use a global page table (GGTT) for memory access in addition to local page tables. The GGTT maps the memory region referred as the GPU global address space, which includes frame buffers, command buffers, and GPU memory aperture, which is shared between CPU and GPU. In contrast, AMD and Nvidia GPUs do not have a GGTT and allow direct access to GPU physical memory address space (we consider that these GPUs use a GGTT with flat mappings (e.g. virtual addresses are identical with physical addresses) even though the GGTT does not exist in these GPUs). This implies that GPU memory access may also differ in different GPUs; e.g., the processing engine of Nvidia's GPU can access only the local address space, whereas the Intel's and AMD's can also access the global address space.

It should be noted that (1) a GPU may not provide GPU instructions; (2) a GPU may only comprise processing engines and display engines without any other engines; and (3) a GPU may not have a GGTT as described above. These differences do not contribute a different GPU model, because this present invention covers a superset of these cases.

Implementing a trusted display service on untrusted OS and hardware platforms that support SecApp isolation faces three basic challenges.

Incompatibility with computing platforms. The goal of maintaining object-code compatibility with untrusted OSes (not designed to tamper trusted display) that directly access GPU objects in an unrestricted manner poses a dilemma. If one re-designs and re-implements GPU functions on OSes to block memory accesses that breach address space separation, one introduces object-code incompatibility. If one does not, one forgoes trusted display. To retain compatibility, access to GPU objects by untrusted OS/Apps code must be emulated by the trusted system, which increases the trusted code base and makes high-assurance design impractical.

Inadequate GPU hardware protection. The inadequacy of the hardware for memory protection is well known for Intel GPUs. An address-space separation attack by malicious GPU instructions illustrates another instance of this problem and suggests that simplistic software solutions will not work. For example, verifying address offsets of GPU instructions before execution does not work because operand addressing cannot always be unambiguously determined due to indirect branches and register-indirect memory accesses.

Unverifiable code base. Even if, hypothetically, all the OS/Apps functions that access GPU objects could be isolated and made tamper-proof, their code base would be neither small (i.e., tens of thousands of SLoC) nor simple, and hence the formal verification of their security properties would be impractical. A large number of diverse GPU instructions and commands spread throughout different drivers and application code provide access to a large number of GPU objects; e.g., a GPU can have 625 configuration registers and 335 GPU commands. Furthermore, since the underlying trusted base (e.g., micro-kernel or micro-hypervisor) must protect different SecApps on a computing platform, the functions that access GPU objects directly must be implemented within the trusted base. Hence, these functions' code would have to preserve all existing assurance of the underlying trusted base; i.e., their security properties and proofs must compose with those of the trusted base. These challenges have not been met to date.

SUMMARY OF THE INVENTION

The present invention is a method and apparatus for a trusted display, which enables SecApps to output display content securely on untrusted computing platforms. The central component of the present invention is a GPU Separation Kernel (GSK). The GSK is an add-on trustworthy component that is isolated from the untrusted OS/Apps by the underlying code isolation root-of-trust mechanism (underlying TCB). The GSK provides trusted display to SecApps by safely sharing a GPU between SecApps and untrusted OS/Apps, and overlay SecApps' output over any untrusted display content from OS/Apps. The GSK distinguishes different types of GPU objects, according to their sensitivity to the security of the SecApps' trusted display. The GSK then mediates accesses to security sensitive GPU objects by OS/Apps and SecApps, and prevents malicious accesses that violate the security of trusted display. The GSK also emulates object accesses whenever required by computing-platform compatibility, to avoid re-design/re-implement well-behaved OS/Apps. The GSK minimizes its code base size and complexity, by outsourcing most GPU functions to untrusted OS/Apps with efficient verification of their results, and exporting GPU driver code to SecApps. The GSK also retains the size, complexity, security properties of the underlying TCB. In some embodiments, the GSK can include or be embodied as computer-readable instructions, processor microcode, firmware and/or hardware.

In one exemplary embodiment, the GSK is based on a micro-hypervisor (mHV) as the underlying TCB. The embodiment includes two components: a Trusted Display Kernel (TDK) and a trusted display (TD) add-on to the mHV. The TDK runs at the OS privilege level and provides trusted-display services to user-level SecApps. The TDK also mediates accesses to sensitive GM objects by SecApps and OS/Apps and emulates these access whenever necessary. The TD add-on extends mHV and takes advantage of the mHV primitives to isolate its execution. The TD add-on notifies TDK about untrusted OS/Apps' requests to access sensitive GPU objects. Further, the TD add-on communicates with TDK via fast communication channel, which reduces the performance overhead to OS/Apps by decreasing mHV involved heavy context switches.

DETAILED DESCRIPTION OF THE INVENTION

This invention has four significant advantages. First, the present invention has a minimized and simplified code base, and hence allows the confidentiality and authenticity of display contents to be assured to whatever degree of rigor deemed necessary.

Second, the present invention avoids redesign and modification of underlying trusted system components, and preserves their correctness properties; e.g., proofs of high-assurance micro-kernels and micro-hypervisors.

Third, the present invention preserves full compatibility with well-behaved platforms; i.e., it does not require any modification of OS/Apps code (which not designed to tamper trusted display) and GPU hardware or reduce their functionality. Moreover, the present invention does not modify any other peripheral devices, or require special devices.

Fourth, the present invention maintains a typical primitive user's perception and use of application output and relies on easily identifiable window geometry; e.g., it uses different windows for trusted and untrusted screen areas.

Figure 5:
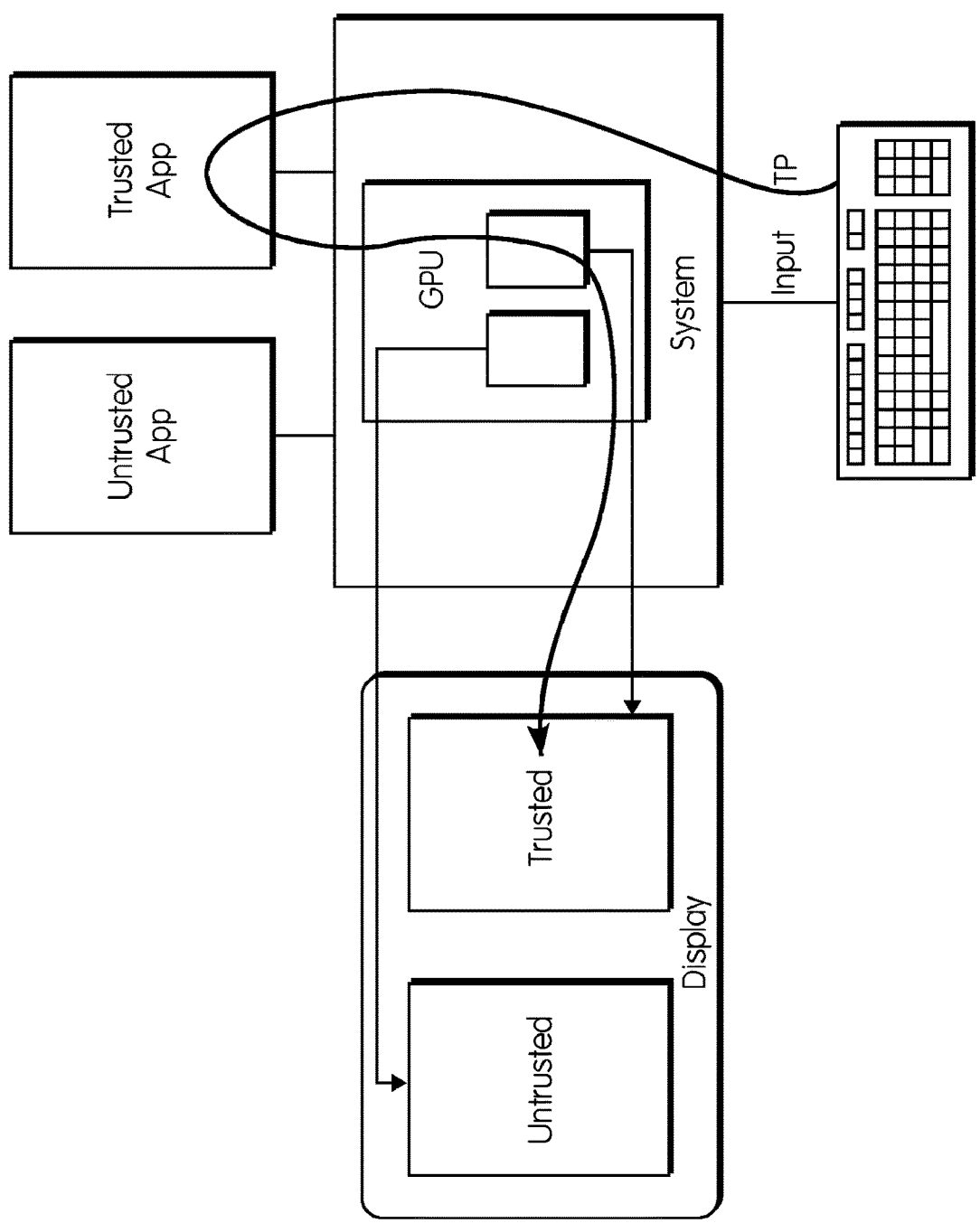
FIG. 5 illustrates the assumed trusted computing path required for implementation of embodiments of the invention.

This invention assumes that the user will be able to establish a trusted path (TP) between the user (i.e., the keyboard) and the GPU, where the TP extends through the SecApps but does not include any untrusted Apps, as shown in FIG. 5. One possible method of establishing such a TP is taught in U.S. Pat. No. 8,832,778 (McCune, et al.), but other methods may be used as well.

This invention also assumes that an adversary can leak a victim SecApp's security-sensitive output via screen scraping attacks whereby the content of display output in a GPU's memory is read by a malicious program of a compromised OS/App or SecApp. The adversary can also modify the victim SecApp's output content, configuration (e.g., geometry, pixel format, frame buffer's base address) via screen painting attacks whereby a malicious program modifies the GPU memory and configuration registers. For example, to launch both attacks the adversary can breach the separation of GPU's address spaces. These breaches can be implemented by unauthorized access to GPU objects, either directly by CPU programs (e.g., drivers, applications, and malicious SecApps), or indirectly by GPU commands and instructions that cause the GPU to access other GPU objects in an unauthorized manner. Furthermore, the adversary can manipulate the display engine's data paths and overlay a new frame buffer over a victim SecApp's display thereby breaking the integrity of SecApps' display output without touching its contents.

To solve the security challenges of trusted display service on computing platforms, an add-on security architecture based on a GPU Separation Kernel (GSK) was designed. This section illustrates its architecture, and highlights how it solves the three security challenges.

The present invention can include or be embodied as computer-readable instructions, processor micro-code, firmware, hardware, and other embodiments which, when executed, causes the processor to perform certain actions according to the present invention.

Figure 1:
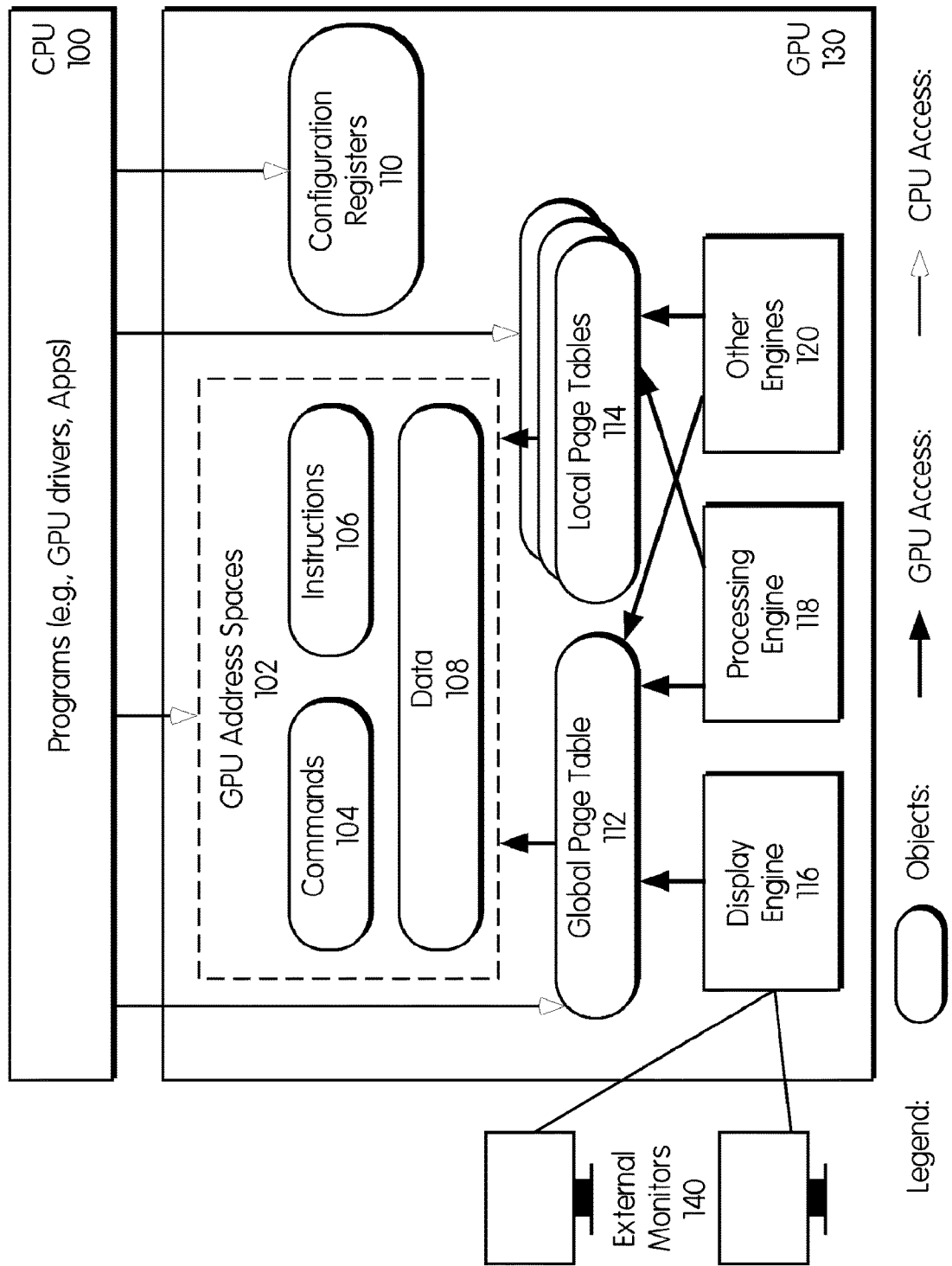
FIG. 1 illustrates an exemplary architecture of a typical modern GPU in accordance with which embodiments may operate.
Figure 2:
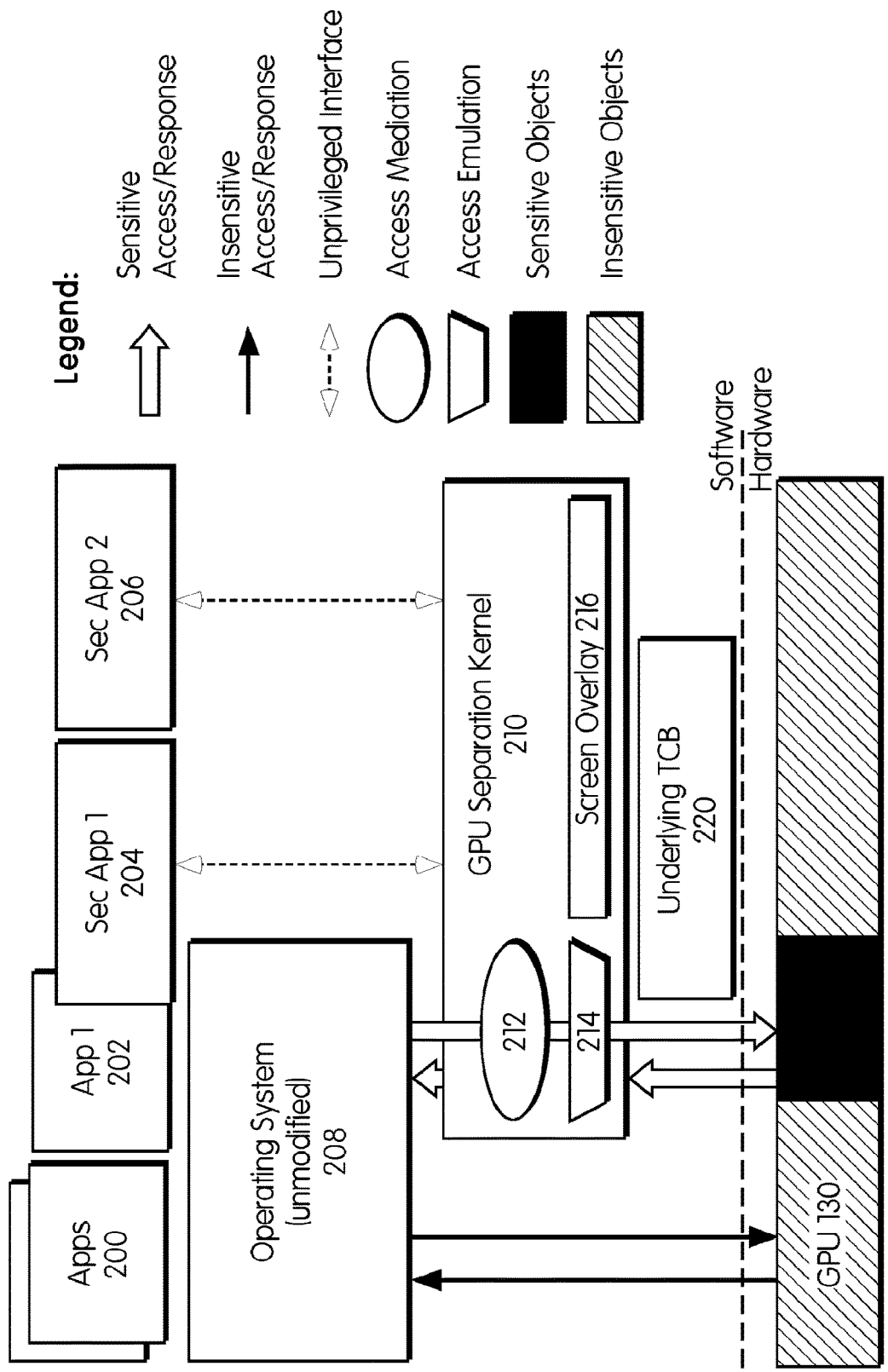
FIG. 2 illustrates an exemplary architecture of GPU separation kernel (GSK). The grey boxes represent the trusted codes of SecApps.

In one embodiment, the present invention includes a platform (as shown in FIG. 1), comprising:
1. One or more processors 100.
2. One or more video cards. Each of the said video cards (not shown) includes one or more GPUs 130, and is connected to one or more external monitors 140 (devices to present image/animation, including but not limited to Liquid-Crystal-Display (LCD) monitors). Video cards are also connected to the platform (e.g., in one non-limiting example, one video card is connected to the northbridge via the PCIe bus. In another non-limiting example, multiple video cards are connected to the northbridge via the PCIe bus). It should be noted that "connect" may also mean that two or more elements are not in direct contact with each other, buy yet still co-operate or interact with each other. In the next, we will use the term "GPU" to refer to both the video card and the graphic processing unit.
3. Memory. Memory connected to the processor and including computer-readable instructions which, when executed by the processor, cause the processor to create a computing platform having at least three components, as shown in FIG. 2:

(1) One or more untrusted operating systems (OSes) 208, which can run one or more untrusted applications (Apps) 200, 202, on top of OSes 208. OSes 208 can be commodity OSes (e.g., Windows OS, Android) or special-purposed ones (e.g., including but not limited to, hardened OS, security kernels) for bare-metal or virtualized environments, on, including but not limit to, computers, real-time systems, embedded systems and mobile platforms etc. For Apps 200, 202, some applications 200 are security-insensitive, while other applications 202 contain security-sensitive codes 204 to run on top of GSK. The applications can be commodity applications or special-purposed applications (e.g., including but not limited to, applications under development).

In some embodiments, the untrusted OS/Apps 208, 200, 202 access GPU 130. In other embodiments, the untrusted OS/Apps 208, 200, 202 do not access GPU 130 at all. It should be noted that the present invention works in case of no OS/Apps access GPU. In this situation, a SecApp 204, 206 may still need trusted display service, because the GPU(s) are possibly shared among multiple SecApps 204, 206.

(2) An underlying Trusted Computing Base (TCB) 220. The underlying TCB runs at the most-privileged level of the platform and is used to create isolated domains. Each isolated domain contains, but is not limited to CPU states and exclusively owned regions of memory. The underlying TCB 220 partitions memory into at least two portions, one for the exclusive use of the GPU Separation Kernel (GSK) 210, discussed below, with zero or more SecApps 204, 206, and one for the exclusive/non-exclusive use of the untrusted OSes 208 with zero or more untrusted applications 200, 202. Underlying TCB 220 also isolates itself from any isolated domains. Underlying TCB 220 uses one or more hardware/ software security primitives, and is embodied in the following forms, including but not limited to, secure kernel, micro-hypervisor, hypervisor, or embodied as hardware functions (such as, including but not limited to, employing existing or future extension to the Intel Software Guard Extensions (SGX) technique).

In some embodiments, underlying TCB 220 further provides certain security primitives. These security primitives include but not limited to: (a) memory access control: which isolated domains can access which memory region(s). (b) attestation root-of-trust which enables the primitive users to measure the identity of its isolated domain and report the measured identity to an external third party for verifying.

(3) A GPU separation kernel (GSK) 210, wherein GSK 210 runs on top of underlying TCB 220, and runs in one or more different isolated domains (namely secure isolated domains) than the ones for the untrusted OSes 208 and untrusted applications 200, 202 (namely untrusted isolated domains). In some embodiments, GSK 210 can be implemented in the underlying TCB 220, or as an extension to underlying TCB 220 (including but not limited to, as a software component hosted by the underlying TCB).

GSK 210 can be implemented in one or more privilege levels. In some embodiments, part or all of GSK 210 can be implemented in the lower-privileged level (including but not limited to unprivileged level). In other embodiments, part or all of GSK 210 can be implemented in a higher-privileged level.

GSK 210 intercepts one or more accesses to the GPU objects by the OS/Apps/SecApps. GSK 210 accesses GPU 130 and GSK 210 has at least a lower-privileged level (including but not limited to unprivileged level) to run one or more SecApps 204, 206. GSK 210 provides unprivileged interfaces to SecApps 204, 206 to output their graphic contents. The unprivileged interfaces provide ways to exchange information (including but not limited to, data, and interrupts/events) between GSK 210 and SecApps 204, 206. The unprivileged interfaces include, but are not limited to, system calls, or even shared memory region(s) only.

In some embodiments, GSK 210 executes in the same secure isolated domain with zero or more SecApps 204, 206 on each CPU 100. In other embodiments, GSK 210 runs in its own isolated domain, while SecApps 204, 206 running in one or more different secure isolated domains communicate with GSK 210 across isolated domain boundaries.

Zero or more trusted SecApps 204, 206 run on top of GSK 210. A SecApp 204, 206 comprises, in a non-limiting example, business logics (not shown), utility libraries (not shown), and unprivileged drivers (not shown). Each SecApp 204, 206 requires trusted display service, and generates security-sensitive graphic content to be output to one or more screen locations of one or more external monitors 140, over any graphic output from untrusted OS/Apps 208, 200, 202. Each of such graphic output regions of SecApp 204, 206 is known as a SecApp window. SecApps 204, 206 provide their window geometries, including but not limited to window sizes and window positions. It should be noted that GSK 210 is allowed to run without any SecApps 204, 206 in some embodiments.

In some embodiments, SecApps 204, 206 issue GPU commands and GPU instructions to generate display output using GPU 130. In other embodiments, SecApps 204, 206 employ CPU 100 to generate display output. In either case, SecApps 204, 206 use the unprivileged interfaces provided by GSK 210 to output graphic contents of SecApps 204, 206 on the primitive user indicated external monitors 140.

On top of the platform, GSK 210 can further completely separate GPU objects and their accesses. GSK 210 completely mediates accesses to sensitive GPU objects. Moreover, GSK 210 emulates these accesses whenever required by computing platform compatibility, and overlaps SecApps graphic output over any graphic output from untrusted OS/Apps to enable trusted display service.

(1) GSK 210 can intercept one or more accesses to one or more GPU objects by untrusted OS/Apps, as shown in FIG. 2. GSK 210 can further intercept one or more accesses to one or more GPU objects by SecApps 204, 206 via unprivileged interfaces. FIG. 2 also shows that GSK 210 may process accesses to GPU objects by SecApps 204, 206 using the access mediation component 212 and/or access emulation component 214 and/or the screen overlay component 216.

(1.1) The access interception to GPU objects will now be discussed. In some embodiments, access interception of GSK 210 pauses the corresponding OS/Apps/SecApps, and resumes them after the access interception finishes. In other embodiments, access interception of GSK 210 does not pause the corresponding OS/Apps/SecApps. In other words, the access interception of the GSK runs in parallel with OS/Apps/SecApps.

(1.2) The access interception of the GSK intercepts, including but not limited to, Memory-Mapped I/O (MMIO) and/or Port I/O (PIO) accesses to GPU objects.

(1.3) In some embodiments, GSK 210 disables/removes the access interception to one or more GPU objects. In a non-limiting example, if there is no SecApp running, GSK 210 may disable/remove the access interception to GPU objects. In another non-limiting example, if hosting only one SecApp among all CPUs 100, GSK 210 may disable/remove one or more of the unprivileged interfaces, and allow SecApp 204, 206 to directly access one or more GPU objects (including, but not limited to, a separate frame buffer in CPUs support hardware overlay).

(2) The access mediation component 212 of GSK 210 separates all GPU objects into security-insensitive GPU objects and security-sensitive GPU objects, according to their impact to the trusted display security. The corresponding virtual and physical GPU memory regions are regarded as insensitive and sensitive, accordingly. Access mediation component 212 separates the accesses of GPU objects by untrusted OS/Apps/SecApps, and mediates these accesses by enforcing a set of "access invariants".

(2.1) The security-sensitive GPU objects are those that can be programmed by untrusted software (e.g., malicious drivers, applications) to break the confidentiality or authenticity of trusted display output, and those which can be tainted by access to other sensitive GPU objects. In a non-limiting example, sensitive GPU objects include directly accessible objects, such as frame buffers, page tables, configuration registers, and objects that can affect the security of other objects, such as GPU commands, and instructions, which can modify GPU page table structures. The security-insensitive GPU objects cannot affect the confidentiality and authenticity of trusted display even if they are manipulated by malicious software.

(2.2) The access separation of GPU objects allows direct access to security-insensitive GPU objects, and verified (mediated) access to security-sensitive GPU objects from OS/Apps/SecApps. Specifically, the access separation of GPU objects are defined below.

(2.2.1) The access mediation component 212 does not mediate accesses to the security-insensitive GPU objects.

(2.2.2) The access mediation component 212 mediates every CPU access to all of the said sensitive GPU objects by OS/Apps/SecApps. In some embodiments, GSK 210 disallows SecApps 204, 206 from directly accessing any GPU objects (neither security sensitive GPU objects, nor security insensitive GPU objects). In other embodiments, GSK 210 allows SecApps 204, 206 to directly access at least one GPU object.

(2.2.3) The access mediation component 212 mediates the GPU commands before submitting to the GPU by OS/Apps/SecApps. In some embodiments, GSK 210 disallows SecApps 204, 206 from submitting any GPU commands. In other embodiments, GSK 210 allows SecApps 204, 206 to submit at least one GPU command.

(2.2.4) The access mediation component 212 comprises an efficient address-space separation mechanism to avoid mediating the GPU instructions submitted by OS/Apps/

SecApps. In some embodiments, GSK 210 disallows SecApps 204, 206 from submitting any GPU instructions. In other embodiments, GSK 210 allows SecApps 204, 206 to submit at least one GPU instruction.

(2.2.5) The access mediation component 212 comprises a GPU command protection mechanism to avoid any modification on mediated GPU commands.

(2.3) The access invariants ensure the security of the SecApps' display output and must hold at all intermediate points during trusted-display operation. The access invariants enforce "content security" to defend from breach of the confidentiality and authenticity of trusted display content, and "configuration integrity" to avoid integrity violation of trusted display configurations. The access invariants are defined below:

(2.3.1) GPU data. Content security requires the following invariants: (a) no untrusted read of the trusted display's frame buffer; and (b) no untrusted write to sensitive GPU data.

(2.3.2) GPU page tables. The following invariants must hold for GPU address space separation: (a) no untrusted OS/Apps/SecApps can map sensitive GPU memory to be writable in any GPU local page tables; (b) no untrusted OS/Apps/SecApps can map the trusted display's frame buffer to be readable in any GPU local page tables; (c) untrusted OS/Apps/SecApps must have a single mapping to sensitive GPU memory in GPU global address space; and (d) GPU instructions uploaded by untrusted OS/Apps/SecApps cannot reference the GPU's global address space.

(2.3.3) GPU configuration registers. Configuration integrity requires the following invariants: (a) no untrusted re-configuration of SecApps' display; and (b) no untrusted re-configuration of sensitive GPU memory. Content security requires the following invariant: no untrusted read of the trusted display's frame buffer, and no untrusted write to sensitive GPU memory. In addition, the invariant that untrusted access to configuration cannot violate the access invariants of GPU page tables must also be enforced.

(2.3.4) GPU commands. Content security requires the following invariants: (a) no untrusted GPU command can read trusted display's frame buffers; and (b) no untrusted GPU command can write sensitive GPU memory. In addition, the invariant that untrusted GPU commands cannot violate (a) any GPU configuration register invariants, and (b) GPU page table invariants must also be enforced.

(2.4) The outcomes of the access mediation component 212 is allowing or preventing an access to sensitive GPU objects on GPU hardware. If an access to GPU object violates any of the access invariants, the access mediation component 212 prevents access to the GPU hardware which would otherwise be allowed.

(2.4.1) In some embodiments, the access mediation component 212 further raises one or more warnings in case of preventing an access to sensitive GPU object on GPU hardware. In a non-limiting example, the warning is embodied as a pop-up message box shown to the primitive user. In another non-limiting example, the warning is embodied as terminate the SecApps, or even the GSK. In yet another non-limiting example, the warning occurs in user un-noticeable forms, e.g. including but not limited to logging to files.

(2.4.2) In some embodiments, the operation of preventing an access to sensitive GPU objects on GPU hardware is overloaded by warnings. In a non-limiting example, the primitive user discovers the threats via warnings, but allows the SecApps to continue execution under his/her consent.

(2.4.3) In some embodiments, preventing an access to sensitive GPU objects on GPU hardware is embodied as faking an access to sensitive GPU objects on GPU hardware. In a non-limiting example, the access mediation component 212 returns dummy values for read accesses instead of preventing the read accesses which violate any of the access invariants.

Figure 6:
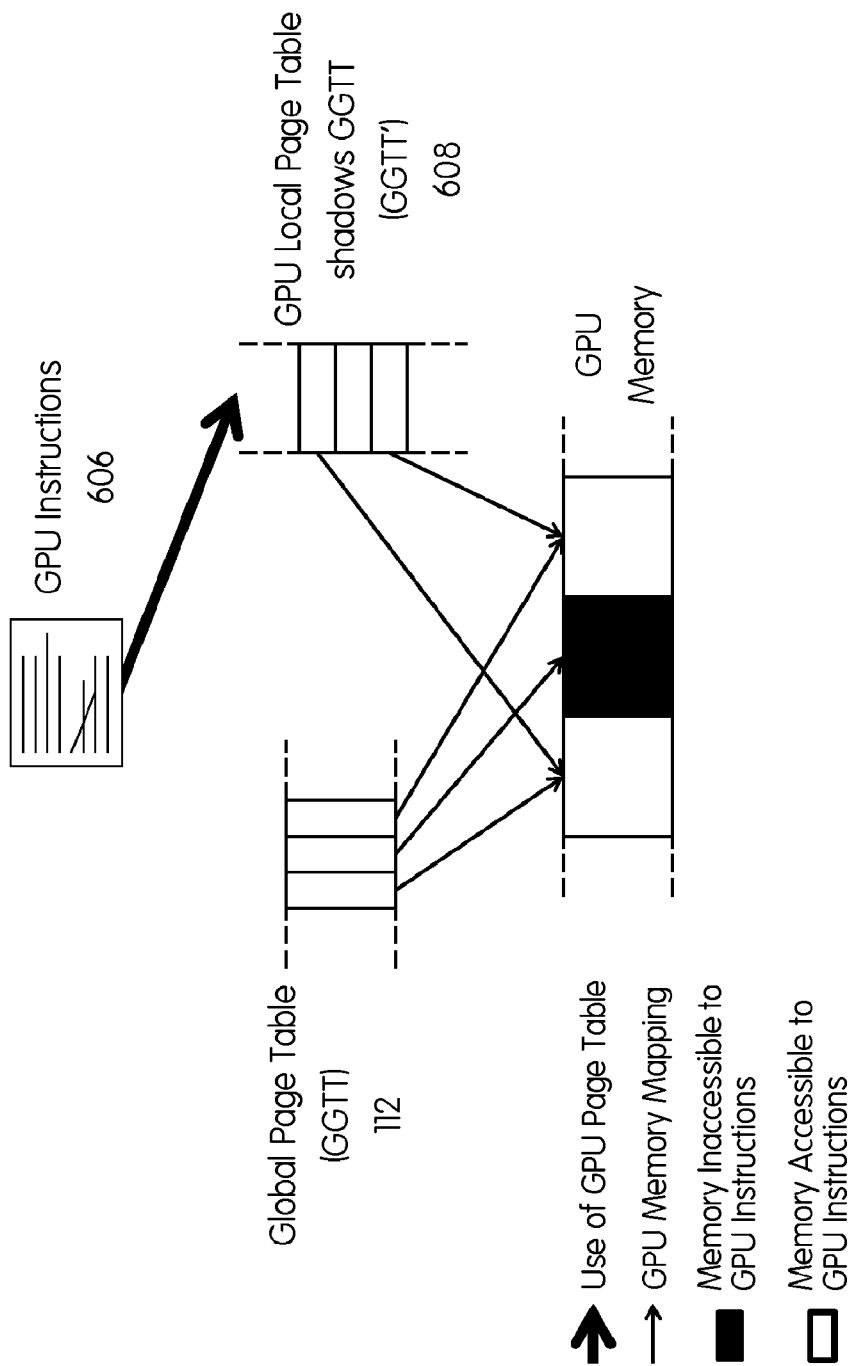
FIG. 6 shows the address space separation mechanism of the present application.

(2.5) The address-space separation mechanism limits the memory accesses of GPU instructions 606 only to those allowed by local GPU page tables. As shown in FIG. 6, the address-space separation mechanism performs as follows:

(2.5.1) In the initialization of the address-space separation mechanism, the address-space separation mechanism (a) shadows the GGTT 112 in a GPU local page table (GGTT') 608 without mappings violating the access invariants of a GPU local page table.

(2.5.2) In any GGTT modification, the address-space separation mechanism (a) verifies the GGTT modification according to the said access invariants; (b) if the GGTT modification is allowed, the address-space separation mechanism updates both GGTT' and GGTT accordingly. If the GGTT modification is denied, neither GGTT nor GGTT' updates. In some embodiments, a warning is raised in case of GGTT modification is denied.

(2.5.3) Alternatively, in any GGTT modification, the address-space separation mechanism performs the following steps instead: (a) update GGTT and GGTT' (b) verifies GGTT and GGTT' according to the access invariants (c) if the GGTT modification is denied, the GGTT and GGTT' rolls back their modifications, otherwise not. In some embodiments, a warning is raised in case of GGTT modification is denied.

(2.5.4) Before executing GPU instructions submitted by OS/Apps/SecApps on GPU, the address-space separation mechanism performs the following steps in arbitrary order: (a) load GGTT' (b) modify one or more related GPU objects, to direct GPU instructions execution to use GGTT' for all GPU engines except the display engine, which uses GGTT.

(2.5.4.1) In case of failing to load GGTT' due to no empty GPU local page table slot, the address-space separation mechanism performs: (1) randomly kick out a GPU local page table, (2) load GGTT', (3) modify one or more related GPU objects, to direct GPU instructions execution to use GGTT' for all GPU engines except the display engine, which uses GGTT, (4) switch back the kicked GPU local page table after executing those GPU instructions.

(2.5.4.2) If the current submitting GPU commands will use all GPU page tables, the said address-space separation mechanism (1) splits the submitting GPU commands into smaller groups which do not use all GPU page tables individually, prior to performing step (1) in [0070], (2) submits one or more such small groups of GPU commands which do not use all GPU page tables altogether, following (1)-(4) in (2.5.4.1). (3) After one or more small groups of GPU commands executed, the address space separation mechanism goes back to (2) for un-submitted GPU commands, until all the GPU commands are submitted.

(2.5.5) In some embodiments, the address-space separation mechanism also directs one or more GPU commands which do not related to any GPU instructions to use GGTT' instead of GGTT. In these embodiments, both of the steps (2.5.4.1) and (2.5.4.2) apply.

(2.5.6) In some other embodiments, the address-space separation mechanism applies to GPU virtualization approaches to avoid verification of individual instructions to GPU memory.

(2.6) The GPU command protection mechanism protects mediated GPU command buffers from modification by malicious GPU instructions. In a non-limiting example, GPU command buffers are mapped as read-only in the GPU page tables. In another non-limiting example, the access mediation component 212 uses different GPU hardware protection mechanisms, e.g. GPU privilege protection in some Intel GPUs disallows execution of security sensitive GPU commands from the batch buffers provided by OS/Apps/SecApps. As such, the access mediation component 212 can protect GPU command buffers by de-privileging commands from the batch-buffer mapped in GPU local page tables.

(2.7) In some embodiments, the access mediation component 212 monitors specific GPU configuration registers (e.g. ring tail register) and performs the batch verification of an entire group of submitted GPU commands, instead of trapping and mediating single GPU command individually.

(2.8) The access mediation component 212 further protects verified GPU commands from malicious modification by CPU as such:

(2.8.1) For GPU commands in ring buffers, the access mediation component 212 shadows the ring buffers into one or more different copies ("shadow ring buffers"), and disallows OS/Apps/SecApps from accessing shadow ring buffers.

(2.8.2) For GPU commands in batch buffers, the access mediation component 212 write-protects batch buffers to avoid replacing submitted GPU commands by OS/Apps/SecApps.

(2.9) The access mediation component 212 further comprises a CPU instruction emulator (not shown) to analyze the intercepted accesses to sensitive GPU objects from untrusted OS/Apps. The analysis outcome includes, but is not limited to the identification of the accessed GPU object, access mode (including but not limited to read, write), and access parameters (e.g., the new value to be written). In some embodiments, the CPU instruction emulator is optionally smaller than general purpose instruction emulators in code size to facilitate a verifiable code base. In other embodiments, some or all functions of the CPU instruction emulator is implemented in software, including, but not limited to, a software based CPU instruction disassembler. In other embodiments, some or all functions of the CPU instruction emulator is implemented in hardware, including but not limited to information of trapped CPU instruction provided by CPUs with hardware virtualization support.

(2.10) In some embodiments which support GSK 210 or in which any of the SecApps issue their own GPU commands, the access mediation component 212 includes GPU workload scheduling (not shown). Unlike previous GPU schedulers, the GPU workload scheduling only switches contexts of the shared GPU engines or the shared part of the GPU engines among SecApps and OS/Apps, instead of those of all GPU functions. The GPU workload scheduling is triggered by CPU and/or GPU events, such as V-Sync interrupt, CPU timer interrupt, etc. The CPU and/or GPU events could be either periodic, or non-periodic. The GPU workload scheduling comprises at least the following.

(2.10.1) Save the context of the shared GPU engines or the shared part of the GPU engines for the current workload, submitted by SecApps/OS/Apps/GSK.

(2.10.2) Restore the context of the shared GPU engines or the shared part of the GPU engines for the next workload, submitted by the same or a different SecApps/OS/Apps/GSK.

(2.10.3) Execute the next workload on GPU 130.

(3) The access emulation component 214 of GSK 210 maintains full object-code compatibility with computing platforms. The access emulation component 214 emulates the expected returns in one or both of following two cases:

(a) untrusted OS/Apps access the sensitive GPU objects shared by untrusted OS/Apps and GSK/SecApps; (b) untrusted OS/Apps violate the access invariants when accessing the sensitive GPU objects used by untrusted OS/Apps only. The access emulation component defines the following emulation policies:

(3.1) For GPU data, the access emulation component 214 allocates dummy memory with equal size of the sensitive GPU data, and remaps the sensitive GPU data to the dummy memory for untrusted OS/Apps. The access emulation component 214 emulates the expected returns for an access by redirecting the access to the dummy memory.

(3.2) For GPU configuration registers, the access emulation component 214 maintains emulated registers, and updates their values on untrusted accesses and GPU events (e.g. V-Sync) according to their function definitions. The access emulation component 214 also keeps all the pending updates if the corresponding register requires stateful restoring during trusted-display finalization; e.g., including but not limited to, register update relies on previous updates. The access emulation component 214 emulates the expected returns for an access by accessing the corresponding emulated register. In some embodiments, the access emulation component 214 further commits all the pending updates and the values in emulated registers to GPU hardware during the finalization of the access emulation component 214. This step is not performed in other embodiments, which may not impact compatibility in some cases.

(3.3) For GPU page tables, the access emulation component 214 emulates the expected returns as follows in arbitrary orders: (a) The access emulation component 214 caches any pending mappings violate the access invariants of GPU page tables and submitted by untrusted OS/Apps. The rest pending updates to GPU page tables apply on the corresponding GPU page tables. In both cases, a second pending mapping removes the cached pending mapping with the same GPU memory virtual address mapped in the same GPU page table. The access emulation component 214 updates GGTT' whenever GGTT is modified. (b) Except the original single mapping to sensitive GPU memory in GGTT, the access emulation component 214 updates any cached pending mappings to any sensitive GPU memory to the corresponding said dummy memory in (3.1). The access emulation component 214 updates GGTT' whenever GGTT is modified. (c) Read accesses to GPU page tables go to the cached pending updates first. If missed, the read accesses go to real GPU page tables. In some embodiments, the access emulation component 214 further commits all the cached pending updates during the finalization of the access emulation component 214. This step is not performed in other embodiments, which may not impact compatibility in some cases.

(3.4) For GPU commands, the access emulation component 214 modifies their parameters or results to access emulated objects, to emulate the expected returns.

(4) The screen overlay component 216 of GSK 210 displays the output of SecApps 204, 206 over that of untrusted OS/Apps 200, 202. The screen overlay component 216 provides interfaces to SecApps 204, 206, and performs frame buffer merging in response to SecApps' requests, and also displays a user-chosen pattern to help user verify the source of the display output (i.e., to avoid untrusted OS/Apps from spoofing the user by running untrusted Apps instead of user specified SecApps)

(4.1) The frame buffer merging can be done in two methods:

(4.1.1) Software overlay. The frame buffer merging performs the following steps: (a) the frame buffer merging shadows the frame buffer(s) as output, and locates the frame buffer(s) used by OS/Apps and the frame buffer(s) used by SecApps as input. (b) during the trusted-display session, the frame buffer merging merges the SecApps' display contents over those of untrusted OS/Apps based on their frame buffer data and the SecApps' window geometry information, and outputs the resulting image to the shadow frame buffer. In this process, the frame buffer merging optionally perform additional operations to generate the result image, including but not limited to image rotation, color conversion, and applying transparency. The frame buffer merging can be done with different methods. In some embodiments, the frame buffers are merged in CPU. In other embodiments, the frame buffer merging issues GPU commands (e.g. including but not limited to, 2D blit commands) and/or GPU instructions to accelerate processing. (c) the frame buffer merging programs the GPU display engine to present the shadow frame buffer on the display.

(4.1.2) Hardware overlay. Some of the GPUs provide multiple frame buffers, layer one or more frame buffers over others, and merge them automatically. The frame buffer merging outputs SecApps and untrusted OS/Apps in different frame buffers, and ensures that SecApps are displayed over untrusted OS/Apps.

(4.2) The screen overlay component 216 further comprises additional steps to ensure that the SecApps display content is layered over all untrusted OS/Apps content. In one non-limiting example, the screen overlay component 216 provides and protects its own cursor image, and sets it as the hardware cursor in GPU. In another non-limiting example, the screen overlay component 216 emulates all hardware overlays not used by SecApps to avoid untrusted OS/Apps display over SecApps.

(4.3) In some embodiments, the screen overlay component 216 provides a V-sync interrupt to SecApps 204, 206 to prevent image tearing.

(4.4) In some embodiments, a SecApp 204, 206 by default displays in a rectangle area in the center of the external monitor indicated by the primitive user when initialized. In some embodiments, the primitive user can change such default SecApp window geometry and/or window shape to wherever/whatever the primitive user can easily verify.

(4.5) In some embodiments, the primitive user can change the window geometry/window shape during SecApp runtime, to, for example, display the SecApp window in a new screen position.

(4.6) In some embodiments, the screen overlay component 216 further merges the result image with one or more secret images pre-configured by the primitive user. The pre-configuration includes, but is not limited to, the content of the secret images, and the geometries of the secret images.

(4.7) In some embodiments, the graphic output from different SecApps 204, 206 cannot be overlapped. But, in some embodiments, the graphic output from different SecApps 204, 206 can be overlapped under the primitive user's consent (in a non-limiting example, such consents are based on the primitive user defined policies).

(4.8) In some embodiments, a SecApp 204, 206 allows at least one part of its display output to be transparent, to show any untrusted display content in that region.

(4.9) In some other embodiments, the screen overlay component 216 partitions the frame buffers to be presented on screens, instead of shadowing the frame buffers. In these embodiments, the display outputs of untrusted OS/Apps and SecApps 204, 206 use different partitions of the frame buffer. The GSK 210 avoids access to sensitive partitions of frame buffer from untrusted OS/Apps/SecApps.

(4.10) The screen overlay component 216 further comprises additional steps to display a user-chosen pattern to help user verify the source of the display output. In some embodiments, the screen overlay component 216 achieves the goal by sharing information with user which is never leaked to or tampered by untrusted OS/Apps. In one embodiment, the screen overlay component 216 displays a user-chosen number (e.g., random number). In one another embodiment, the screen overlay component 216 displays different user-chosen image patterns for different user specified SecApps.

(5) GSK 210 runs according to the following life cycle:

(5.1) The initialization of GSK 210 comprises the following steps: (a) the untrusted OS/App provisions GPU objects (including but not limited to shadow frame buffer, V-Sync interrupt) and pins the related GPU memory in GPU global address space. (b) the OS/App invokes the underlying TCB 220 to switch execution to GSK 210 with the configuration of these GPU objects. (c) GSK 210 disables interrupts, and pauses GPU command execution. GSK 210 also enables the GPU access mediation component 212 to intercept accesses to sensitive GPU objects from OS/Apps/SecApps by registering one or more interception handler functions in the underlying TCB 220 and providing unprivileged interfaces to SecApps. (d) GSK 210 initializes the GPU access emulation component 214 and verifies all GPU objects accesses according to the security invariants. (e) GSK 210 configures shadow memories (including but not limited to shadow ring buffer, shadow frame buffer) to start the trusted display service, resumes GPU command execution, enables interrupts, and starts SecApp execution. (f) the steps (a)-(e) are not needed for a SecApp unless all previous SecApps that used the trusted display terminated. Some embodiments may require additional steps, including, but not limited to, construction of one or more new secure isolated domains. Some embodiments may use alternative steps, including but not limited to, extending the underlying TCB 220 with the hardcoded interception handler functions in step (c). Some embodiments may change step orders, including, but not limited to, pausing GPU command execution prior than disabling interrupts in GSK 210 in step (c).

(5.2) The finalization of GSK 210 comprises the following steps: (a) GSK 210 zeros all shadow GPU objects. (b) GSK 210 disables interrupts, pauses GPU command execution, (c) GSK 210 finalizes the GPU access emulation component 214, and restores the GPU configuration registers and GPU page tables to the ones expected by untrusted OS/Apps. (d) GSK 210 stops intercepting accesses to sensitive GPU objects, finalizes the GPU access mediation component 212 and removes any registered interception handler functions from the underlying TCB 220, resume GPU command execution and interrupts. (e) GSK 210 invokes the underlying TCB 220 to return to the untrusted OS/Apps, which release related GPU objects and unpins their GPU memory in GPU global address space. Some embodiments may require additional steps, including, but not limited to, destroying one or more secure isolated domains. Some embodiments may use alternative steps or change step orders, including, but not limited to, employing empty functions instead of removing interception handler functions in the underlying TCB 220 in step (d).

(5.3) GSK 210 performs the following steps to handle accesses to sensitive GPU objects from OS/Apps/SecApps:

(a) GSK 210 intercepts accesses to sensitive GPU objects by untrusted OS/Apps, via the registered interception handler functions in the underlying TCB 220. GSK 210 intercepts accesses to sensitive GPU objects by SecApps, via the provided untrusted interfaces. (b) GSK 210 pauses the execution of the corresponding OS/Apps/SecApps. (c) GSK 210 generates information of the sensitive access. (d) GSK 210 mediates the access, and emulates the access if necessary, according to previous descriptions (2)-(3). (e) After the access mediation and access emulation are finished, the GSK 210 resumes the execution of the corresponding OS/Apps/SecApps. Some embodiments may require additional steps. Some embodiments may use alternative steps or change step orders, including, but not limited to, using hardcoded interception handler functions instead of registered interception handler functions in step (a). In some embodiments, the GSK 210 does not pause the execution of the corresponding OS/Apps/SecApps conditionally.

This invention is different from and cannot be achieved by any full GPU virtualization approaches. In other words, adopting full GPU virtualization for high-assurance trusted display would be impractical. This section first describes the insecurity of previous full GPU virtualization approaches. As a concrete example, we illustrate a class of new attacks that exploit the inadequacy of address-space separation on fully virtualized GPUs. Then, we analyze why full GPU virtualization intrinsically requires a large trusted code base to be compatible with OS/Apps, and how this present invention achieves a small trusted code base. Besides, we compare the size and complexity of trusted code bases in the present invention and one representative full GPU virtualization approach.

Address Space Separation Attacks A fully virtualized GPU shares its global address space with multiple virtual machines (VMs) to support concurrent accesses to its memory. For example, while the GPU's display engine fetches a VM's frame buffer to display its content, the GPU's processing engine generates content for other VMs' frame buffers. Furthermore, the hardware design of the GPU's processing engines (e.g. Intel, AMD) allows instructions to access the global address space. Because full GPU virtualization supports native drivers, any malicious VMs can submit GPU instructions that access another VM's GPU data for screen output.

Figure 3:
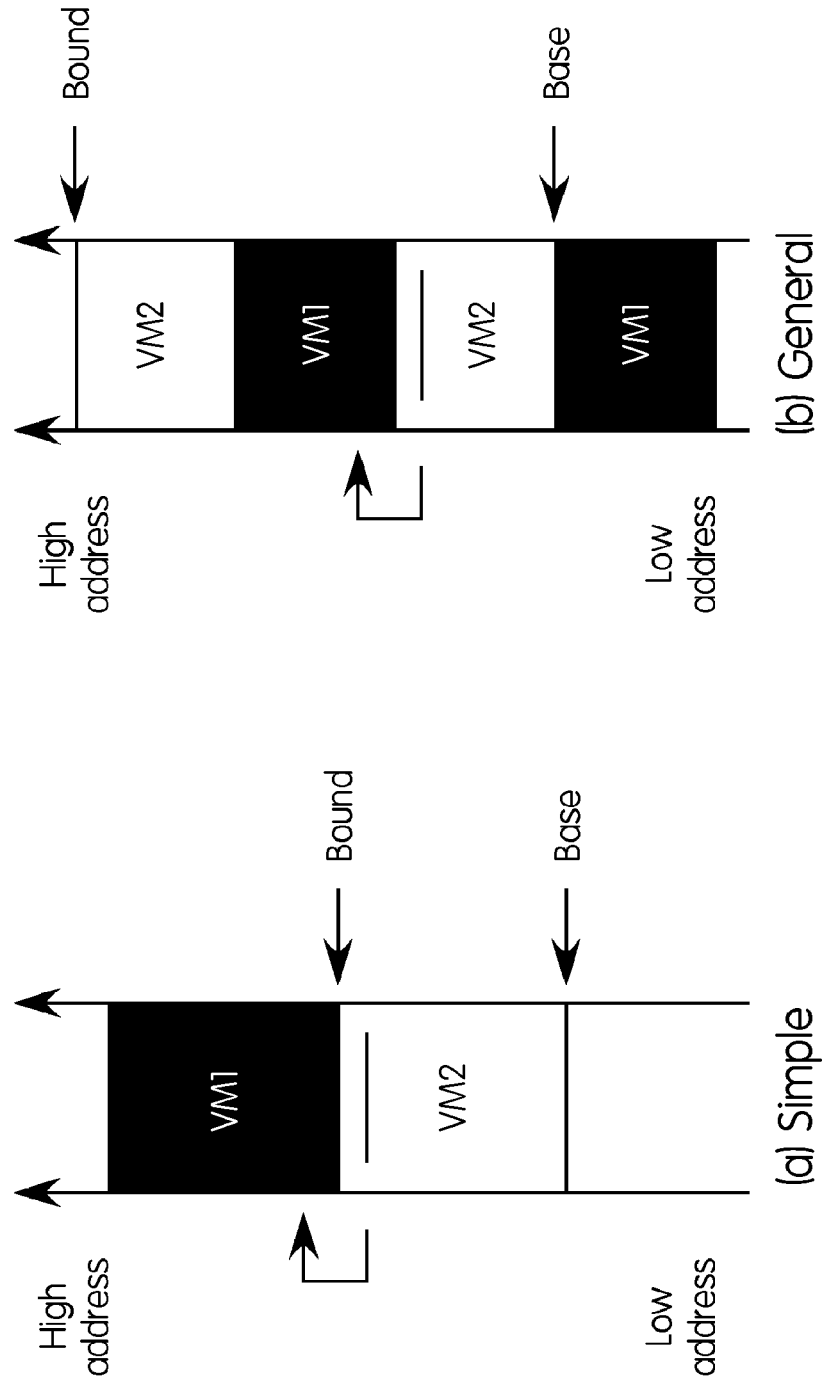
FIG. 3 illustrates two forms of GPU address-space separation attacks.

FIG. 3(a) illustrates this simple attack. Here, a malicious VM2 submits valid GPU instructions that ostensibly address GPU memory inside VM2's address space but in fact access victim VM1's GPU memory. For example, VM2 can submit malicious instructions that contain large address offsets which fall into VM1's GPU address space (Other full GPU virtualization approaches are also subject to such attacks). Unless an additional "base-and-bound" mechanism for address space protection is supported by GPU address translation, the GPU's processing engine would allow the malicious VM2 to access victim VM 1's GPU output data thereby violating confidentiality and authenticity.

We note that some fully virtualized GPUs support a single "base-and-bound" pair of registers for address space protection; e.g., Intel GPUs limit memory access range of GPU instructions by correct setting of the "base-and-bound" register pair for GPU command execution. These GPUs can mediate memory accesses and deny address-space violations by GPU instructions and commands issued by malicious VMs.

Unfortunately, a single pair of base and bound registers is insufficient to counter all address-space separation attacks mounted by malicious VMs. These attacks are enabled by another important performance optimization of full GPU virtualization. That is, address space "ballooning" allows the GPU to directly access virtual memory at addresses provided by guest VMs. This optimization improves GPU memory-access performance and greatly reduces complexity of GPU virtualization. Without it, trusted code would have to translate the referenced GPU virtual addresses for every object, and even recompile GPU instructions on the fly. For example, AMD's GPU instructions perform register-indirect memory accesses, and hence would require such recompilation for address translation.

However, address space ballooning allows the GPU memory of a guest VM to be mapped into two or more noncontiguous blocks in GPU global address space; e.g., one in GPU memory aperture for exchanging data between CPU and GPU, and the other in non-aperture space for holding GPU data. As a consequence, the separated memory blocks cannot be protected by the setting of the single pair of "base and bound" registers in the GPU commands; e.g., viz., Intel GPU. As illustrated in FIG. 3(b), malicious VM2 uses the simple attack of FIG. 3(a) but this time it can access victim VM1's GPU memory despite base-and-bound protection, because one of VM1's GPU memory blocks falls between two of VM2's non-contiguous memory blocks. It should be noted that the simple attack possibly succeeds for other GPUs; e.g. some instructions in AMD GPUs can perform register-indirect memory accesses, without specifying added address-space protection.

Trusted Code Base Full GPU virtualization multiplexes GPU by time-sharing all GPU functions among one or more VMs. Each VM contains a native OS which assumes full control over the GPU. Thus, full GPU virtualization has to emulate accesses to all GPU objects of the VMs scheduled to access the GPU. Otherwise, VMs waiting for GPU must be stalled whenever accessing GPU, and hence waste their CPU resources significantly.

Among these GPU objects, all GPU configuration registers must be emulated by any full GPU virtualization approach. Failure to emulate all accesses causes incompatibility with untrusted OS/Apps. However, a GPU can have hundreds of configuration registers (e.g. Intel 7th generation GPUs have 625 GPU configuration registers), each of which provides multiple function configurations and status. Thus, the emulation requires significant engineering effort and difficult to be formally verified.

In this invention, the GSK code base is both small and simple, and hence verifiable, for the following three reasons. First, the number of security-sensitive GPU objects is very small. Most of the GPU objects are security-insensitive, and can be direct accessed without kernel mediation.

Second, the GSK outsources most GPU functions (including all GPU functions used by software and GPU objects provisioning for trusted display) to untrusted OS/Apps because it can verify all untrusted-code results very efficiently. The verification is driven by the policy invariants. Furthermore, only a small number of sensitive GPU objects require function emulation and this takes only a small amount of code. Thus, implementing the GPU functions themselves (e.g., the large and complex native GPU drivers) within the GSK becomes unnecessary. The GSK also exports GPU driver code to SecApps using standard techniques; i.e., the traditional GPU software stack already de-privileges frame buffer rendering functions and management logic and exports them to user-level libraries. The GSK uses a similar approach, except that it requires SecApps to provide their own display contents. In some embodiments, the GSK disallows SecApps directly access any GPU objects and does not generate new GPU workloads by itself, and hence is even smaller and simpler. This is because the said GSK has no need to implement GPU workload scheduling in this case.

Third, the GSK preserves existing assurance of the underlying trusted code bases. This is because the GSK relies on existing security primitives and services already provided by the underlying trusted code bases; e.g., CPU physical memory access control, and Direct Memory Access control.

TABLE 1

Number of GPU Objects Requiring Access Mediation.

| GPU Object | Mediation in | | Total |
| --- | --- | --- | --- |
| | GSK | Full GPU Virtualization | |
| GPU Data | ~6 MB | All other VM's data | 2 GB |
| GPU Configuration Registers | 39 | 711 | 625 |
| GPU Page Tables | | All | |
| GPU Commands | 21 | 43 | 269 |
| GPU Instructions | 0 | 14 | 66 |

The number of GPU objects that require access mediation by GSK is much smaller than the number of GPU objects mediated in full GPU virtualization approaches; See Table 1. This comparison is based on the Intel 7th generation GPUs (Haswell), which has an open-source driver (released by Intel) and detailed documentation. For GPU data, the Haswell GPU maps a 2 GB GPU memory into the GGTT. Full GPU virtualization hosts the bulk of other VM's GPU data in the global address space, whereas in our system the sensitive GPU memory is mapped in only about 6 MB. The memory used for sensitive GPU objects includes the shadow framebuffers (3750 KB for screens with 1200*800 resolution and 4 bytes per pixel), GGTT (2052 KB), and other very small sensitive GPU memory areas; e.g., shadow ring buffers (128 KB). Note that the ratio of sensitive GPU objects to all GPU objects may vary, since the protection of multiple local GPU page tables requires more mediation of GPU data accesses and also increases the mapped memory space.

The GSK has to mediate access to far fewer GPU configuration registers than full GPU virtualization. That is, access to 39 out of 625 GPU configuration registers require mediation, 13 of which are needed for hardware overlays. In contrast, full GPU virtualization must mediate accesses to all GPU configuration registers to share all GPU functions securely among the different VMs that access the GPU. It should be noted that we count registers using the same functional clustering as in Intel's documentation. This differs slightly from others, which lists registers individually. Full GPU virtualization also mediates access to more GPU commands than the TDK since it needs to perform additional tasks such as the virtualization of the GPU 2D/3D processing engine. In addition, the TDK does not need to mediate accesses of individual GPU instructions due to its use of the address-space separation mechanism. It should be noted that GSK needs to mediate more GPU objects if it allows GSK/SecApps to directly use more GPU functions to accelerate trusted display. But the numbers are still significantly less than those of full GPU virtualization, because SecApps do not need to use all GPU functions, including but not limited to, power settings and frequency management.

The implementation of one embodiment of the invention is 35829 SLoC (Source Lines of Code). In contrast, the code size of full GPU virtualization approaches is much larger. It contains a Xen hypervisor of 263K SLoC and a privileged root domain that has over 10M SLoC.

Safe Sharing of Other GPU Engines The present invention can be used to accomplish safe sharing other GPU functions as well, including but not limited to General Purpose Computing on GPU (GPGPU) engines, 2D/3D rendering engines. In these cases, the GPU may not include a said display engine. And the result invention may not provide trusted display.

Exemplary Embodiments The present invention will now be described in terms of a specific embodiment. This embodiment is only illustrative of the present invention. However, the present invention is not limited to the specific embodiment illustrated and described herein.

Figure 4:
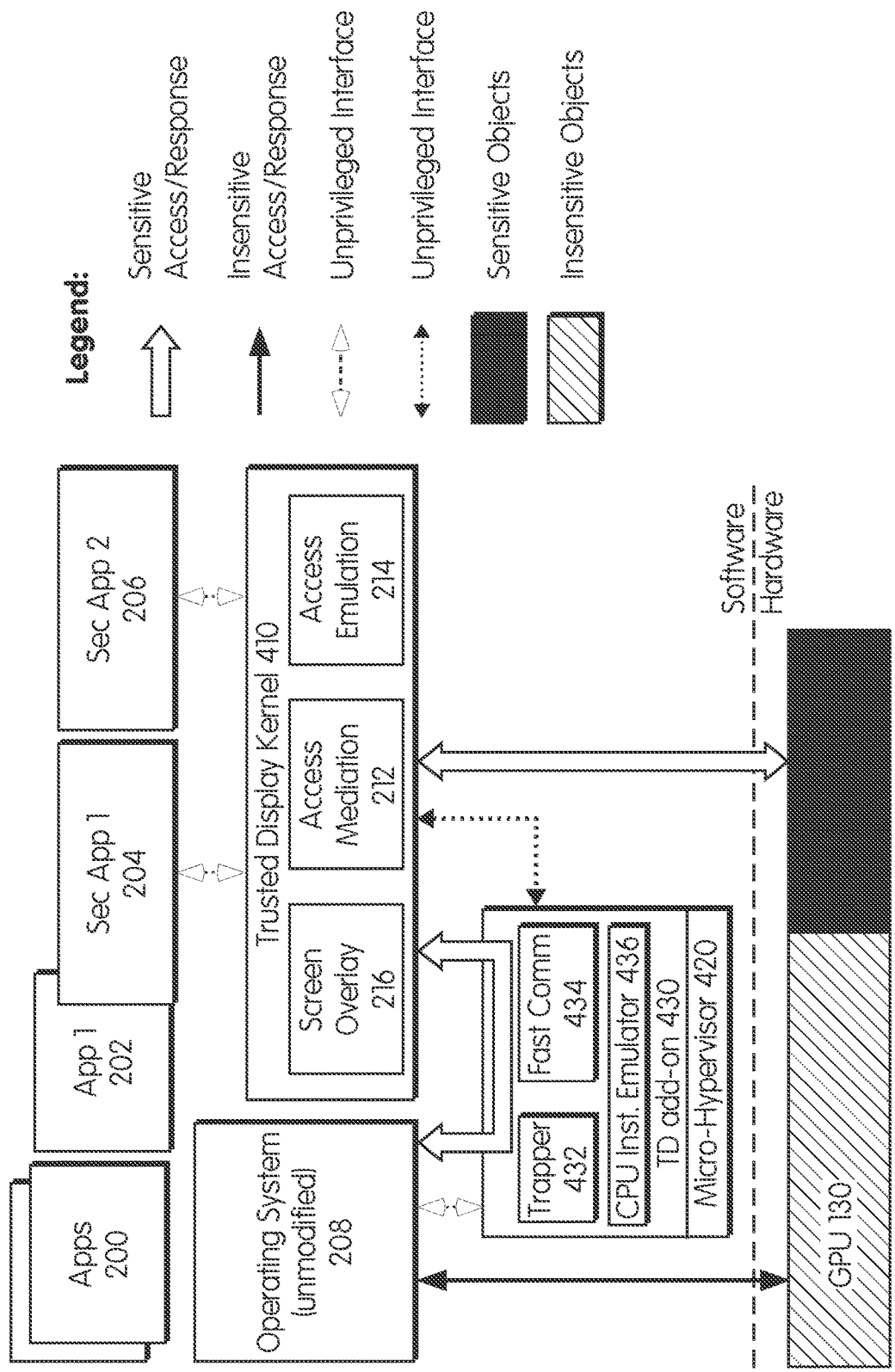
FIG. 4 illustrates the architecture of a refinement of the exemplary embodiment of GPU separation kernel of FIG. 2. The grey boxes represent the trusted codes of SecApps.

Split GSK In this embodiment, the GSK can be split in multiple components with different privilege level. As shown in FIG. 4, the GSK can be implemented as an add-on security architecture based on two components: a Trusted Display Kernel (TDK) 410 and a trusted display (TD) add-on 430 to the underlying micro-hypervisor (mHV) 420. In other embodiments, the TDK 410 and/or the TD add-on 430 can be embedded into or hosted by the mHV 420.

(1) The current embodiment disallows SecApps 204 and 206 from directly accessing GPU 130, while some other embodiments allow it. Some embodiments replace the said underlying mHV 420 with different underlying TCB s.

(2) TDK 410 runs in the OS privilege level, comprises:

(2.1) the screen overlay component 216, which performs all functions of the screen overlay component 216 of GSK.

(2.2) access mediation component 212, which performs most functions of the access mediation component 212 of GSK. In this embodiment, all the functions of the CPU instruction emulator of the access mediation component 212 are implemented in the TD add-on as the CPU instruction emulator 436. In this embodiment, access mediation component 212 uses the CPU's protection rings to prevent SecApps access GPU objects directly (2.3) access emulation component 214, which performs all functions of the access emulation component 214 of GSK.

(3) The TD add-on 430 extends the mHV 420 and runs in the same privilege level with mHV 420. In some embodiments, the TD add-on 430 is less privileged than mHV 420. The TD add-on 430 comprises:

(3.1) the trapper component 432, which implements all the functions of the access interception of the GSK.

(3.2) the CPU instruction emulator component 436, which implements all the functions of the CPU instruction emulator of the said access mediation component 212.

(3.3) In some embodiments, the TD add-on 430 further comprises one or more fast communication channels 434 to facilitate communications between TD add-on 430 and the TDK 410 on multi-core platforms. The fast communication channels 434 comprises:

(3.3.1) Memory shared between the TD add-on 430 and the said TDK 410 to hold their communication data.

(3.3.2) Using Inter-Processor Interrupts (IPI) for cross-core notification.

(3.3.3) The current embodiment disallows the TD add-on 430 from receiving IPI interrupts caused by the fast communication channels 434, and hence only the TD add-on 430 can initiate communications on the fast communication channels 434. In some embodiments, the TD add-on 430 scan receive IPI interrupts, and hence allows both TDK 410 and TD add-on 430 to initiate communications on the fast communication channels 434.

(3.3.4) The current embodiment requires the TD add-on 430 to busy wait for a response from TDK 410 after sending a request. In some embodiments, the TD add-on/TDK conditionally busy wait for TDK's/TD add-on's response after sending a request.

Move/Resize SecApp Display Output In this embodiment, a SecApp 204, 206 can update the window geometries of their display output following these steps: (a) SecApp 204, 206 generates new window geometry configuration according to the primitive user's request. (b) SecApp 204, 206 invokes one or more unprivileged interfaces of the GSK with the new window geometry configuration as one of the parameters. (c) the GSK verifies the new window geometry configuration to avoid overlapping with display output of other SecApps 204, 206, and then records the configuration. (d) the GSK updates the shadow frame buffer according to the new window geometry configuration immediately, or at a future time.

In other embodiments, moving/resizing display output of SecApp 204, 206 may not be supported.

V-Sync Delivery In this embodiment, the GSK allows both the untrusted OS/Apps and the SecApps 204, 206 to receive V-Sync events. In the GSK initialization, the following additional steps are performed: (a) the untrusted OS/Apps enable V-Sync events of GPU, and request V-Sync event delivery to each of the CPU. (b) the GSK verifies the enabling and delivery of V-Sync events. When the GSK runs (after initialization), the following additional steps are performed: (c) when generated by the GPU, a V-Sync event arrives to both of the untrusted OS and the GSK. (d) the GSK notifies each SecApp 204, 206 which registers to receive V-Sync event, such notification includes but not limited to marking the arrival of V-Sync event in memory shared between a SecApp and the GSK, and/or invoking the V-Sync event handler callback function provided by a SecApp.

In some embodiments, for periodical V-Sync events, the GSK additionally verifies if the events arrivals on time. In some other embodiments, the GSK replaces V-Sync events with timer interrupts, and hence only requires the steps (c) and (d) above. In yet other embodiments, V-Sync events delivery may not be supported.

Hiding Hardware Cursor Position To use hardware cursor acceleration provided by CPUs, the cursor positions must be provided to several GPU configuration registers, which can be accessed by untrusted OS/Apps/SecApps. However, the positions of hardware cursors on the screen (e.g. the coordinates of the mouse pointer on the screen) are sensitive to some SecApps. Thus, this embodiment forbids untrusted access (both read and write) to the positions of hardware cursors by OS/Apps/SecApps, and also enforces the access invariants on the positions of hardware cursors. In some embodiments, a SecApp can access the hardware cursor if the GSK hosts only one SecApp among all CPUs.

In other embodiments, hiding the hardware cursor position may not be required.

GPU Reset In some embodiments, the GSK intercepts accesses to GPU reset configuration registers and/or GPU commands by untrusted OS/Apps. In these embodiments, the GSK performs additional operations before the GPU resets, including but not limited to, notifying all SecApps about the GPU reset.

In other embodiments, the GSK does not intercept accesses to GPU reset configuration registers and/or GPU commands.

Alternative Platforms In a non-limiting example, the present invention can also be used on ARM platforms. On ARM platforms, the present invention use alternative hardware based security primitives, such as TrustZone, and/or hardware virtualization technique on ARM.

Trusted Display in Virtual Desktop A server system may host SecApps in the form of virtual desktops with zero or more CPUs installed in the server. The users can access the SecApps remotely: display contents are transferred to the users' computers while the computation of SecApps is done on the remote server.

To ensure the security of SecApps' display content in this case, some embodiments can use the GSK with the access mediation component, the access emulation component and the said screen overlay component, It should be noted that, the sensitive CPU objects may include at least the frame buffer in some embodiments. And even the said frame buffer may reside outside the GPU.

We claim:

1. A method of providing a trusted display for secure applications on an untrusted computing platform using a graphic processing unit (GPU) having a plurality of GPU objects associated therewith, comprising:
   determining which of the plurality of GPU objects are security-sensitive objects;
   mediating accesses to the security-sensitive GPU objects issued by the secure applications and non-secure operating systems and applications; and
   emulating accesses to a subset of the security-sensitive GPU objects for the non-secure operating systems and applications.

2. The method of claim 1 wherein mediating access to the security-sensitive GPU objects includes enforcing a set of access invariants.

3. The method of claim 2 wherein emulating access to the subset of the security-sensitive GPU Objects includes emulating expected returns from accesses to GPU objects.

4. The method of claim 3 wherein the returns are emulated when untrusted components access security-sensitive GPU objects shared by the non-secure operating systems and applications or when untrusted components access the subset of the security-sensitive GPU objects in violation of the access invariants.

5. The method of claim 3 further comprising prioritizing displaying output of secured applications over displaying output of non-secure operating systems and applications.

6. The method of claim 3 wherein the method is implemented by software running in a secured environment provided by a trusted computing base.

7. The method of claim 6 wherein the trusted computing base provides a trusted path from one or more user input devices to the GPU, the trusted path including one or more secure applications executing in the secured environment provided by the trusted computing base.

8. The method of claim 7 wherein a user-chosen pattern inaccessible to the non-secure operating systems and applications is displayed on a user visible display area selected by a secure application.

9. The method of claim 1 wherein the GPU is accessed by the secure applications and the non-secure operating systems and applications concurrently.

10. The method of claim 6 wherein the trusted computing base is implemented as a micro-hypervisor.

11. The method of claim 2 further comprising:
   intercepting accesses to any of the security-sensitive GPU objects; and
   verifying a configuration of the security-sensitive GPU objects by the non-secure operating systems and applications.

12. The method of claim 1 further comprising:
   displaying output from the secure applications in a first display window and output from non-secure operating systems and applications in a second display window.

13. The method of claim 1 wherein the GPU is part of a video card driving one or more external displays.

14. The method of claim 1 wherein mediating accesses to the security-sensitive GPU objects further comprises allowing or preventing access to the security-sensitive GPU objects.

15. The method of claim 14 further comprising:
   raising one or more warnings when access to a security-sensitive GPU object is prevented.

16. The method of claim 11 wherein verifying the configuration of said security-sensitive objects includes verifying all or a subset of the set of access invariants.

* * * * *